United States Patent [19]
Wu

[11] Patent Number: 6,038,440
[45] Date of Patent: Mar. 14, 2000

[54] PROCESSING OF EMERGENCY CALLS IN WIRELESS COMMUNICATIONS SYSTEM WITH FRAUD PROTECTION

[75] Inventor: Woody Wu, Plano, Tex.

[73] Assignee: Ericsson Inc., Reserach Triangle Park, N.C.

[21] Appl. No.: 08/880,273

[22] Filed: Jun. 23, 1997

[51] Int. Cl.[7] .................................................. H04Q 7/20
[52] U.S. Cl. ........................ 455/410; 455/404; 455/411
[58] Field of Search .................... 455/403, 422, 455/404, 410–411, 455, 521, 527; 379/37, 45

[56] References Cited

U.S. PATENT DOCUMENTS

| | | | |
|---|---|---|---|
| 4,425,480 | 1/1984 | Lischin | 379/200 |
| 5,303,285 | 4/1994 | Kerihuel et al. | 455/461 |
| 5,335,265 | 8/1994 | Cooper et al. | 455/410 |
| 5,465,388 | 11/1995 | Zicker | 455/404 |
| 5,517,554 | 5/1996 | Mitchell et al. | 379/59 |
| 5,524,135 | 6/1996 | Mizikovsky et al. | 455/411 X |
| 5,555,551 | 9/1996 | Rudokas et al. | 379/59 |
| 5,563,931 | 10/1996 | Bishop et al. | 455/404 |
| 5,596,625 | 1/1997 | LeBlanc | 455/404 |
| 5,608,781 | 3/1997 | Seiderman | 379/59 |
| 5,850,599 | 12/1998 | Seiderman | 455/406 |
| 5,956,634 | 9/1999 | Otterson et al. | 455/410 |

FOREIGN PATENT DOCUMENTS

WO 97/23104   6/1997   WIPO.

*Primary Examiner*—William G. Trost
*Attorney, Agent, or Firm*—Robert A. Samra

[57] ABSTRACT

A call processing system for a wireless communications network comprises a mechanism for detecting a call placed from a mobile station in the network to a multi-digit number dialed by a user of the mobile station; a mechanism for determining whether the call is indicated to be fraudulent; a mechanism for determining whether the dialed number is a predefined multi-digit emergency number; a mechanism for completing the call if the call is indicated not to be fraudulent, or if the dialed number is determined to be an emergency number even if the call is indicated to be fraudulent; and a mechanism for blocking the call if the call is indicated to be fraudulent and the dialed number is determined not to be an emergency number.

22 Claims, 2 Drawing Sheets

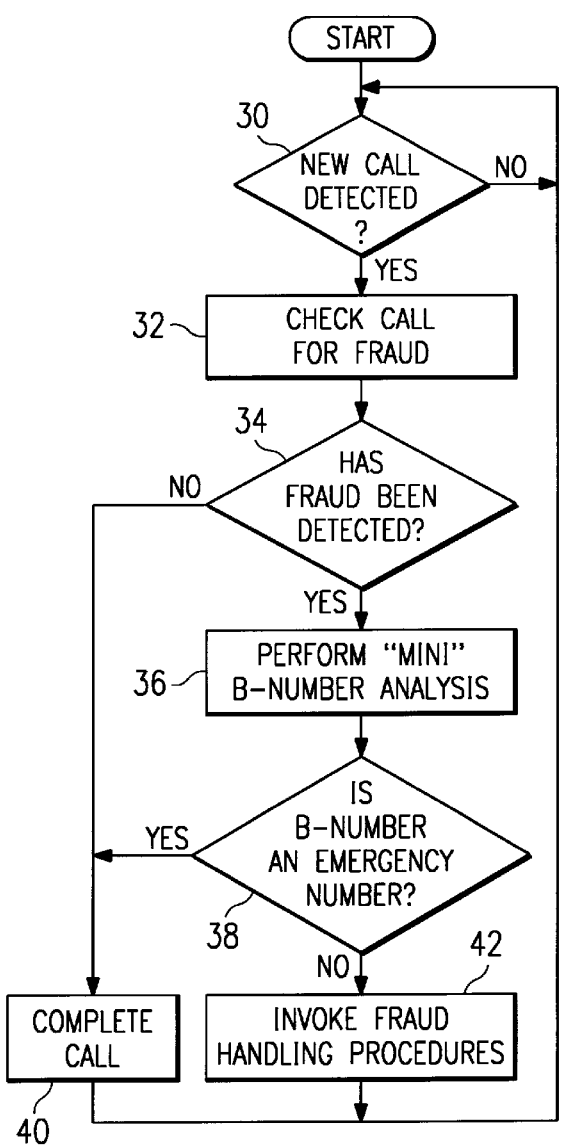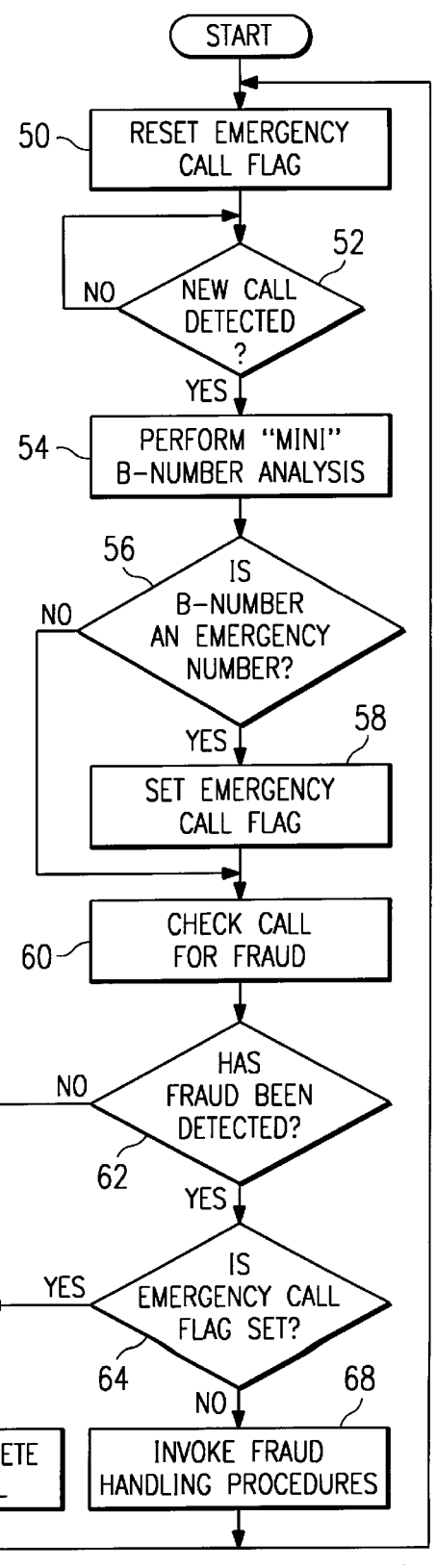

PROCESSING OF EMERGENCY CALLS IN WIRELESS COMMUNICATIONS SYSTEM WITH FRAUD PROTECTION

BACKGROUND OF THE INVENTION

1. Technical Field

The present invention relates to the processing of emergency calls in a wireless communication system which implements fraud detection and handling procedures and, more specifically, to preventing such calls from being blocked due to the implementation of such procedures.

2. Related Prior Art

The prior art includes cellular radio systems which have been operating in the United States and Europe for the last two decades. Cellular telephone service operates much like the fixed, wireline telephone service in homes and offices, except that radio frequencies rather than telephone wires are used to connect telephone calls to and from the mobile subscribers. Each mobile subscriber is assigned a private (10 digit) directory telephone number and is usually billed based on the amount of "airtime" he or she spends talking on the cellular telephone each month. Many of the service features available to landline telephone users (e.g., call waiting, call forwarding, three-way calling, etc.) are also generally available to mobile subscribers. In each market area, mobile subscribers usually have the freedom to subscribe to service from at least two systems. The local system from which service is subscribed is called the "home" system. When travelling outside the home system, a mobile subscriber may be able to obtain service in a distant system if there is a "roaming" agreement between the operators of the home and "visited" systems.

The architecture for a typical cellular radio system is shown in FIG. 1. A geographical area (e.g., a metropolitan area) is divided into several smaller, contiguous radio coverage areas, called "cells", such as cells C1–C10. The cells C1–C10 are served by a corresponding group of fixed radio stations, called "base stations", B1–B10, each of which includes a plurality of radio frequency (RF) channel units (transceivers) that operate on a subset of the RF channels assigned to the system, as well known in the art. The RF channels allocated to any given cell may be reallocated to a distant cell in accordance with a frequency reuse plan as is also well known in the art. In each cell, at least one RF channel, called the "control" or "paging/access" channel, is used to carry control or supervisory messages. The other RF channels are used to carry voice conversations and thus are called the "voice" or "speech" channels. The cellular telephone users (mobile subscribers) in the cells C1–C10 are provided with portable (hand-held), transportable (hand-carried) or mobile (car-mounted) telephone units, collectively referred to as "mobile stations", such as mobile stations M1–M5, each of which communicates with a nearby base station. Each of the mobile stations M1–M5 includes a controller (microprocessor) and a transceiver, as well known in the art. The transceiver in each mobile station may tune to any of the RF channels specified in the system (whereas each of the transceivers in the base stations B1–B10 usually operates on only one of the different RF channels used in the corresponding cell).

With continuing reference to FIG. 1, the base stations B1–B10 are connected to and controlled by a mobile telephone switching office (MTSO) 20. The MTSO 20, in turn, is connected to a central office (not specifically shown in FIG. 1) in the landline (wireline) public switched telephone network (PSTN) 22, or to a similar facility such as an integrated services digital network (ISDN). The MTSO 20 switches calls between wireline and mobile subscribers, controls signalling to the mobile stations M1–M5, compiles billing statistics, stores subscriber service profiles, and provides for the operation, maintenance and testing of the system. An important function of the MTSO 20 is to perform a "handoff" of a call from one base station to another base station B1–B10 as one of the mobile stations M1–M5 moves between cells. The MTSO 20 monitors the quality of the voice channel in the old cell and the availability of voice channels in the new cell. When the channel quality falls below a predetermined level (e.g, as the user travels away from the old base station towards the perimeter of the old cell), the MTSO 20 selects an available voice channel in the new cell and then orders the old base station to send to the mobile station on the current voice channel in the old cell a handoff message which informs the mobile station to tune to the selected voice channel in the new cell.

Access to the cellular system of FIG. 1 by any of the mobile stations M1–M5 is controlled on the basis of a mobile identification number (MIN) and an electronic serial number (ESN) which are stored in the mobile station. The MIN identifies the service subscription and is a binary representation of the 10-digit directory telephone number of the mobile subscriber. The MIN is assigned by the cellular service provider (home system operator) and is usually programmed into a mobile station either when purchased by the original user or when sold to another user (i.e., at the time of service installation). The MINs of valid (paying) subscribers are stored by the MTSO 20. The ESN uniquely identifies the mobile station and is a digital number which is supplied by the manufacturer and permanently stored in the mobile station (i.e., factory-set, not to be altered in the field). The ESNs of mobile stations which have been reported to be stolen can be appropriately marked by the MTSO 20 and denied service permanently.

User authorization for cellular service is usually performed at every system access (e.g., call origination) by a mobile station. When making an access, the mobile station forwards the MIN and ESN to the system. The MTSO 20 maintains a "white list" containing the MIN/ESN pairs of valid home subscribers and a "black list" containing the ESNs of stolen or otherwise unauthorized mobile stations. The MTSO 20 checks the received MIN/ESN pair to determine whether it belongs to a valid home subscriber and, if not, whether the MIN belongs to an authorized "roamer" from another system and whether the ESN has been blacklisted. If the MIN/ESN pair is not valid, or if the MIN is not recognized or if the ESN is blacklisted, the mobile station may be denied access. Otherwise, the user is considered valid and the access is accepted.

The original cellular radio systems, as described generally above, used analog transmission methods, specifically frequency modulation (FM), and duplex (two-way) RF channels in accordance with the Advanced Mobile Phone Service (AMPS) standard. This original AMPS (analog) architecture formed the basis for an industry standard sponsored by the Electronics Industries Association (EIA) and the Telecommunications Industry Association (TIA), and known as EIA/TIA-553. In the middle to late 1980s, however, the cellular industry both in the United States and Europe began migrating from analog to digital technology, motivated in large part by the need to address the steady growth in the subscriber population and the increasing demand on system capacity. The industry thus developed a number of air interface standards which use digital voice encoding (analog-to-digital conversion and voice compression) and advanced digital radio techniques, such as time division multiple access (TDMA) or code division multiple access (CDMA), to multiply the number of voice circuits (conversations) per RF channel (i.e., to increase capacity).

In Europe, the GSM standard, which uses TDMA with "frequency hopping", has been widely implemented. In the United States, the EIA/TIA has developed a number of digital standards, including IS-54(TDMA) and IS-95 (CDMA), both of which are "dual mode" standards in that they support the use of the original AMPS analog voice and control channels in addition to digital speech channels defined within the existing AMPS framework (so as to ease the transition from analog to digital and to allow the continued use of existing analog mobile stations). The dual-mode IS-54 standard, in particular, has become known as the digital AMPS (D-AMPS) standard. More recently, the EIA/TIA has developed a new specification for D-AMPS, which includes a digital control channel suitable for supporting data services and extended mobile station battery life. This new specification, which builds on the IS-54B standard (the current revision of IS-54), is known as IS-136.

In addition to providing for a new, digital radio transmission format, many of the newer digital standards (including IS-136 and IS-95) specify the use of an authentication procedure for confirming the identity of mobile stations requesting service in a cellular system. This procedure, which also has been imported into newer analog standards such as IS-91 for narrowband AMPS (N19 AMPS) and Revision A of EIA/TIA-553 (EIA/TIA-553A currently under development), was developed in response to the widespread, fraudulent use of MIN/ESN pairs to steal cellular service from existing analog systems. Many of the mobile stations which have been sold to date do not comply with the tamper-proof requirement for ESN and, consequently, can be easily programmed with a new ESN (there is no tamper-proof requirement for MIN and, hence, all mobile stations can be easily programmed with a new MIN). Thus, these mobile stations can be programmed to transmit any MIN/ESN pair so as to "trick" the system into granting access. Further background on this MIN/ESN "tumbling" and the resultant revenue and service losses can be found in the article entitled "Cellular Fraud" by Henry M. Kowalczyk, in Cellular Business, dated March 1991, at pp. 32–35.

Fraud in the form of MIN/ESN tumbling arose primarily in a "manual roaming" environment where the cellular systems were not interconnected on a real-time basis. Since each MTSO usually contained a list only of valid MIN/ESN pairs belonging to the home subscribers, it did not have immediate access to the counterpart lists in the other systems. Hence, by using a roamer MIN (i.e., a 10-digit directory telephone number containing an area code other than the local area code of the home system operator) and a non-blacklisted ESN, a fraudulent mobile station could receive service from the local cellular system until an indication of the invalidity of the MIN/ESN pair has been received (perhaps hours later) from the home system of the pretending roamer (or from a clearing house). In an "automatic roaming" environment, however, the cellular systems are networked together on a real-time basis in accordance with the provisions of an industry standard such as EIA/TIA standard IS-41 (or through a proprietary signalling protocol). Consequently, the serving cellular system can obtain verification of a MIN/ESN pair from the home system virtually immediately and can, therefore, deny service to a MIN/ESN tumbler without significant delay.

Of more concern recently has been a type of fraud known as "cloning" in which a fraudulent user adopts the bona fide MIN/ESN pair of a valid (paying) subscriber. The fraudulent user may surreptitiously acquire a bona fide MIN/ESN pair, or even a list of valid MIN/ESN pairs, in several ways. For example, in some instances, bona fide MIN/ESN numbers are printed on, and may be read from, a label which is affixed to a mobile station belonging to a valid subscriber. In other instances, a list of bona fide MIN/ESN pairs may be purchased on the "black market" or directly from an employee of the cellular operator. In addition, since each mobile station transmits the MIN/ESN pair to the serving exchange at every system access, one or more bona fide MIN/ESN pairs may be intercepted by listening to radio transmissions on the (analog) control channel.

The cellular industry has developed a number of interim solutions for detecting fraud. For example, current cellular systems monitor suspicious activities indicative of cloning fraud such as when a particular MIN/ESN is shown to be simultaneously engaged in two calls or, alternatively, to have placed two calls from two different locations within a shorter time interval than would be normally required to travel between those locations. However, the long-term solution to the fraud problem is seen to lie in fraud prevention rather than merely fraud detection. The authentication procedures in the newer industry standards aim at fraud prevention by requiring mobile stations to have the proper authentication data (in addition to a proper MIN/ESN) in order to receive service from the system. The authentication data is generated from identical sets of shared secret data (SSD) which are stored and periodically updated in a mobile station and its serving system. The authentication data generated in the mobile station is sent to the serving system to be compared with the internally generated authentication data for the purpose of confirming the identity of the mobile station. Since a clone mobile station is assumed not to have access to the initial value of the SSD or the subsequent history of SSD updates in a valid mobile station, the authentication data sent by the clone mobile station will not match the authentication data in the system, and therefore the system should be able to recognize the clone mobile station and deny it service.

In the process of authentication, the base station generates and sends to the mobile station a random bit pattern, called RAND or RANDU, on the analog control channel (ACCH), digital control channel (DCCH), analog voice channel (AVCH) or digital traffic channel (DTCH). Each of the mobile station and the base station uses RAND or RANDU, a portion of SSD called SSD-A (the remaining portion, SSD-B, is used for encryption, and not for authentication), along with other parameters (e.g., the MIN and ESN of the mobile station) as inputs to a Cellular Authentication and Voice Encryption (CAVE) algorithm, which is defined in Appendix A to each of IS-54B and IS-136, to generate an authentication response called AUTHR or AUTHU (depending on whether RAND or RANDU is used, respectively). The authentication response computed in the mobile station is sent to the base station to be compared with the authentication response computed in the base station. If the authentication responses match, authentication is considered successful (i.e., the base station and the mobile station are considered to have identical sets of SSD). However, if the comparison at the base station fails, the base station may deny service to the mobile station or commence the process of updating the SSD. The procedure for updating SSD for any mobile station involves the generation of a new SSD value through the application of CAVE initialized with mobile station-specific information (ESN), certain random data (RANDSSD), and a secret, permanent authentication key (A-key) which is uniquely assigned to the mobile station.

While the original MIN/ESN screening procedures and the newer authentication procedures are quite useful for effectively dealing with the problem of fraud, those procedures also lead to certain complications in practice. Specifically, those procedures may result in the blocking of an emergency call placed through a mobile station falsely suspected of fraud. As well known in the art, a MIN/ESN or AUTHR/AUTHU mismatch at the system may be caused, for example, by a formatting or transmission error at the mobile station. In that case, a valid subscriber who places an emergency call may be denied service when it is needed the most. Furthermore, even if the MIN/ESN or AUTHR/AUTHU mismatch is truly reflective of the existence of a clone mobile station, it nevertheless may be desirable to complete the emergency call in order to protect the health or welfare of the user of the clone mobile station.

The risk of emergency call blocking is reduced to some extent in certain systems such as those which implement the IS-136 standard. In those systems, a mobile subscriber may initiate an emergency call by pressing an emergency call button in the mobile station which, in turn, sets an emergency call flag in the call origination message from the mobile station to the system. Upon receiving this message, the system will ignore the called party number field in the message and either will not apply the fraud detection procedures to this call or will continue processing the call even if an indication of fraud is detected so as to route the emergency call to the appropriate emergency center. However, there is no provision in those systems for avoiding the blocking of an emergency call placed by dialing an emergency number (e.g., "911") were the call to fail one or more of the checks used by the various fraud detection and/or prevention procedures.

SUMMARY OF THE INVENTION

In view of the deficiencies in the prior art approach to processing calls while also applying fraud protection, the present invention provides new techniques for processing calls such that any emergency calls will be completed despite the use of any fraud protection.

In one aspect, the present invention provides a first method for processing calls in a wireless communications system. This first method comprises the steps of detecting a call placed from a mobile station in the system to a multi-digit number dialed by a user of the mobile station; determining whether the call is indicated to be fraudulent; if the call is indicated to be fraudulent, determining whether the dialed number is a predefined multi-digit emergency number; if the call is indicated not to be fraudulent or if the dialed number is determined to be an emergency number, completing the call; and if the call is indicated to be fraudulent and if the dialed number is determined not to be an emergency number, invoking a predetermined fraud handling procedure selected by an operator of the system.

In another aspect, the present invention provides a second method for processing calls in a wireless communications system. This second method comprises the steps of detecting a call placed from a mobile station in the system to a multi-digit number dialed by a user of the mobile station; determining whether the dialed number is a predefined multi-digit emergency number; if the dialed number is determined to be an emergency number, completing the call; if the dialed number is determined not to be an emergency number, determining whether the call is indicated to be fraudulent; if the call is indicated not to be fraudulent, completing the call; and if the call is indicated to be fraudulent, invoking a predetermined fraud handling procedure selected by an operator of the system.

In either the first or second methods of the present invention as set forth above, the step of determining whether the dialed number is an emergency number may comprise the step of mapping the digits of the dialed number to the digits of the emergency number. For example, if the emergency number is "911", the mapping step may comprise the substeps of determining whether the first digit of the dialed number is 9; and if the first digit of the dialed number is determined to be "9", determining whether each of the second and third digits of the dialed number is "1". Furthermore, in either method, the selected fraud handling procedure may comprise blocking the call.

In yet another aspect, the present invention provides a call processing system for a wireless communications network. The call processing system comprises means for detecting a call placed from a mobile station in the network to a multi-digit number dialed by a user of the mobile station; means for determining whether the call is indicated to be fraudulent; means for determining whether the dialed number is a predefined multi-digit emergency number; means for completing the call if the call is indicated not to be fraudulent, or if the dialed number is determined to be an emergency number even if the call is indicated to be fraudulent; and means for blocking the call if the call is indicated to be fraudulent and the dialed number is determined not to be an emergency number.

For applications in which the mobile station is identified by a mobile identification number (MIN) and an electronic serial number (ESN), the means for determining whether the call is indicated to be fraudulent may comprise means for determining whether the MIN/ESN pair is valid or is indicated to be engaged in another call. In addition, for applications in which each of the network and the mobile station generates an authentication response, with the authentication response generated in the mobile station being sent to the network, the means for determining whether the call is indicated to be fraudulent may comprise means for determining whether the authentication response sent from the mobile station matches the authentication response generated in the network.

BRIEF DESCRIPTION OF THE DRAWINGS

The present invention will be better understood and its numerous objects and advantages will become apparent to those skilled in the art by reference to the following drawings in which:

FIG. 2 is a flowchart illustrating the steps for processing calls in the system of FIG. 1, in accordance with a first embodiment of the present invention; and FIG. 3 is a flowchart illustrating the steps for processing calls in the system of FIG. 1, in accordance with a second embodiment of the present invention.

DETAILED DESCRIPTION OF THE INVENTION

Figure 1:
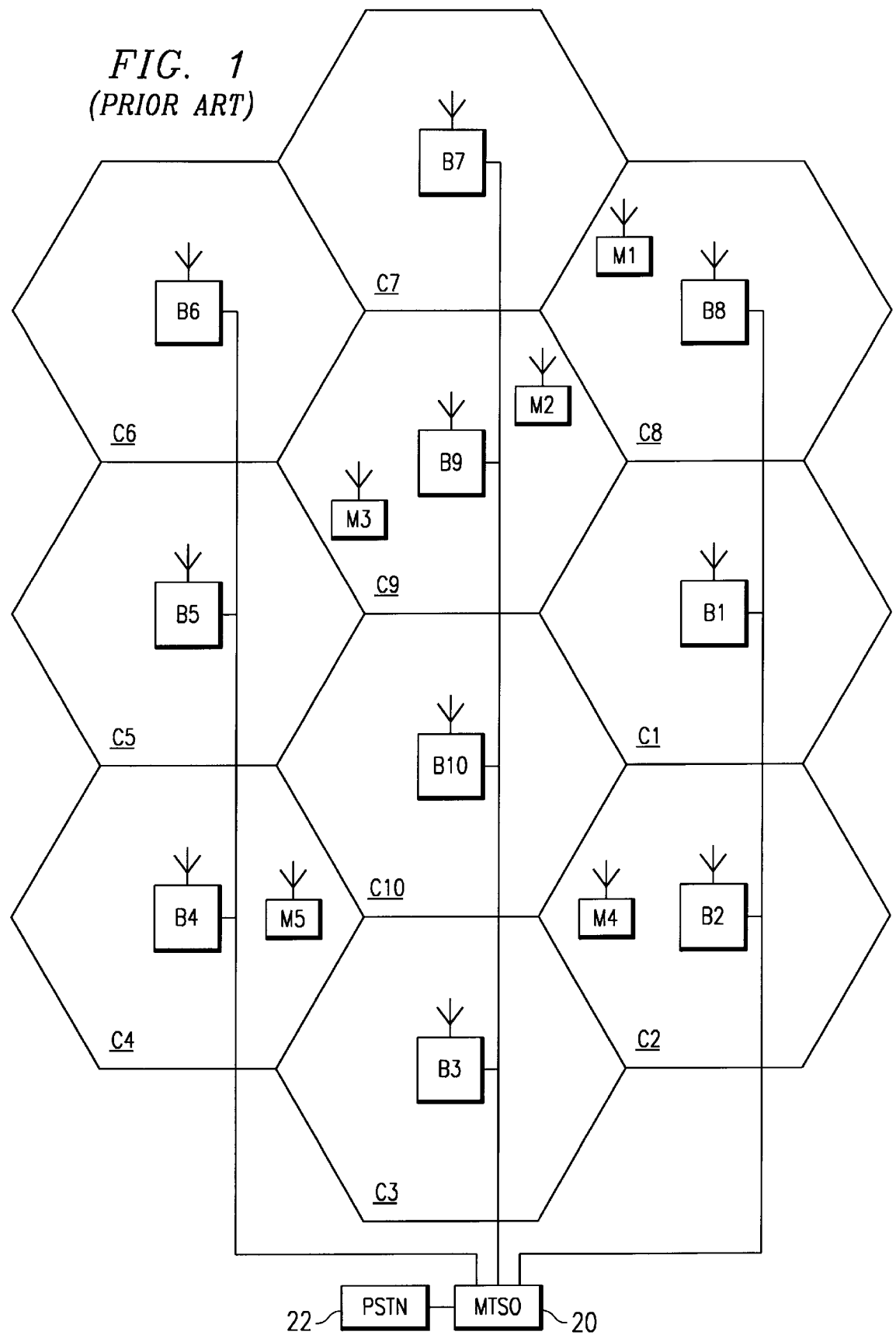
FIG. 1 is a block diagram of an exemplary radio communications system.

Referring now to FIG. 2 there is shown a flowchart of the steps executed by the system (e.g., the MTSO 20 in FIG. 1) in accordance with a first embodiment of the present invention. At step 30 the system determines whether a new call from a mobile subscriber has been detected. For purposes of illustrating the present invention, it is assumed that any call detected by the system at step 30 represents a multi-digit number that has been dialed by the mobile subscriber (i.e., the called number sometimes hereinafter referred to as the "B-number"). However, it should be understood that the system also may support the prior art function allowing for the placement of an emergency or other type of call by pushing a single corresponding button in the mobile station.

With continuing reference to FIG. 2, if a new call is detected at step 30, the system proceeds to step 32 and checks the call for fraud. The checks used in any known fraud detection and/or prevention procedures, including those previously discussed, may be applied at step 32. At step 34 the system determines whether or not fraud has been detected from one or more of the checks applied at step 32. If there is no indication of fraud, the system jumps to step 40 and completes the call. On the other hand, if fraud is indicated, the system proceeds from step 34 to steps 36–38 and performs an abbreviated ("mini") B-number analysis in order to determine whether the called number is an emergency number (i.e., whether this call is an emergency call).

In the preferred embodiment, the mini B-number analysis seeks to quickly and efficiently map the digits of the called number to the emergency number(s) defined for the service area of the system. In the United States, for example, the digit series "911", "0911" and/or "1911" may be used for placing emergency calls. Thus, if the system is operating in the United States, the system may begin the mini B-number analysis by determining whether the first digit of the called number is "9", "0" or "1". If the first digit is found to be "9", the system can then determine whether the second and third digits are both "1". Similarly, if the first digit is found to be "0" or "1", the system can then determine whether the second digit is "9" and, if the second digit is found to be "9", whether the third and fourth digits are both "1".

Returning to FIG. 2, from the results of the mini B-number analysis the system can determine, at step 38, whether the called number is an emergency number or, alternatively, a non-emergency number. If the called number is an emergency number, the system will complete the call at step 40. On the other hand, if the call is a non-emergency call, the system will proceed to step 42 and invoke the fraud handling procedures (i.e., fraud countermeasures) selected by the system operator. Thus, for instance, at step 42 the system may deny (block) the call, route the call to a human attendant or perform a SSD update.

Referring next to FIG. 3 there is shown a flowchart of the steps executed by the system in accordance with a second embodiment of the present invention. The embodiment shown in FIG. 3 uses an emergency call flag which is set (e.g., to the value "1") whenever a call being processed by the system is determined to be an emergency call. Prior to each new call the system resets the emergency call flag (e.g., to the value "0") at step 50. At step 52 the system determines whether a new call has been detected. If a new call is detected, the system proceeds to steps 54–56 and uses the mini B-number analysis to determine whether the call is an emergency call, in a manner similar to steps 36–38 in FIG. 2. If the call is found to be an emergency call, the emergency call flag will be set at step 58 and the call will be checked for fraud at step 60. On the other hand, if the call is a non-emergency call, the system jumps directly to step 60 without setting the emergency call flag.

After the fraud checks are applied at step 60, the system determines whether fraud is indicated at step 62. If there is a fraud indication, the system next determines, at step 64, whether the emergency call flag has been set thus indicating that the current call is an emergency call. If the emergency call flag has been set, the system will complete the call at step 66. The system also will complete the call if no fraud was detected at step 62 regardless of whether or not the current call is an emergency call. On the other hand, if fraud was detected at step 62 and the call is found not to be an emergency call at step 64, the system will invoke the appropriate fraud handling procedures at step 68.

It will be seen that in the embodiment shown in FIG. 2 the system initially determines whether the call is indicated to be fraudulent and, if so, whether it is an emergency call. By contrast, in the embodiment shown in FIG. 3, the system initially determines whether the call is an emergency call and, if so, whether it is indicated to be fraudulent. In either embodiment, however, if the call is an emergency call, it will not be blocked despite its failing to pass the fraud checks applied by the system.

It will be appreciated by persons of ordinary skill in the art that the mini B-number analysis of the present invention may have to be performed less often in the embodiment of FIG. 2, as compared with the embodiment of FIG. 3, since it is expected that the great majority of calls will normally pass the fraud checks so that only a relatively few calls will have to be subjected to the mini B-number analysis in FIG. 2, whereas the B-number analysis is applied to all calls in FIG. 3.

While certain forms or embodiments of the present invention have been illustrated above, those skilled in the art will readily recognize that many modifications and variations may be made to the forms and embodiments of the present invention disclosed herein without substantially departing from the spirit and scope of the present invention. Thus, for example, the embodiment shown in FIG. 3 could be modified such that once it is determined at step 56 that the called number is an emergency number, the system will jump to step 66 and complete the call without checking for fraud. If such modification was to be made, it would be possible to eliminate steps 50, 58 and 64, and to replace the branch from step 56 to step 58 with a branch from step 56 to step 66, and the branch from step 62 to step 64 with a branch from step 62 to step 68 in FIG. 3.

Accordingly, the form of the invention disclosed herein is exemplary and is not intended as a limitation on the scope of the invention as defined in the following claims.

I claim:

1. A method for processing calls in a wireless communications system, the method comprising the steps of:

detecting a call placed from a mobile station in said system to a multi-digit number dialed by a user of said mobile station;

determining whether said call is indicated to be fraudulent;

if said call is indicated to be fraudulent, determining whether said dialed number is a predefined multi-digit emergency number by performing a mini B-number analysis that sequentially compares one or more of the digits of said dialed number to the corresponding digits of said emergency number;

if said call is indicated not to be fraudulent or if said dialed number is determined to be an emergency number, completing said call; and if said call is indicated to be fraudulent and if said dialed number is determined not to be an emergency number, invoking a predetermined fraud handling procedure selected by an operator of said system.

2. The method of claim 1 wherein said emergency number is 911 said mini B-number analysis comprises the substeps of:

determining whether the first digit of the dialed number is 9; and if the first digit of the dialed number is determined to be 9, determining whether each of the second and third digits of the dialed number is 1.

3. The method of claim 1 wherein said emergency number is 0911 and said mini B-number analysis comprises the substeps of:

determining whether the first digit of the dialed number is 0;

if the first digit of the dialed number is 0, determining whether the second digit of the dialed number is 9; and if the second digit of the dialed number is determined to be 9, determining whether each of the third and fourth digits of the dialed number is 1.

4. The method of claim 1 wherein said emergency number is 1911 and said mini B-number analysis comprises the substeps of:

determining whether the first digit of the dialed number is 1;

if the first digit of the dialed number is 1, determining whether the second digit of the dialed number is 9; and if the second digit of the dialed number is determined to be 9, determining whether each of the third and fourth digits of the dialed number is 1.

5. The method of claim 1 wherein said mobile station is identified by a mobile identification number (MIN) and an electronic serial number (ESN) and said step of determining whether said call is indicated to be fraudulent comprises the step of determining whether said MIN/ESN pair is valid.

6. The method of claim 1 wherein said mobile station is identified by a mobile identification number (MIN) and an electronic serial number (ESN) and said step of determining whether said call is indicated to be fraudulent comprises the step of determining whether said MIN/ESN pair is indicated to be engaged in another call.

7. The method of claim 1 wherein each of said system and said mobile station generates an authentication response, the authentication response generated in said mobile station being sent to said system, and said step of determining whether said call is indicated to be fraudulent comprises the step of determining whether the authentication response sent from said mobile station matches the authentication response generated in said system.

8. The method of claim 7 wherein said authentication responses are generated from shared secret data (SSD) stored in each of said system and said mobile station, respectively, and said fraud handling procedure comprises updating the SSD in said mobile station.

9. The method of claim 1 wherein said fraud handling procedure comprises blocking said call.

10. A method for processing calls in a wireless communications system, the method comprising the steps of:

detecting a call placed from a mobile station in said system to a multi-digit number dialed by a user of said mobile station;

determining whether said dialed number is a predefined multi-digit emergency number by performing a mini B-number analysis that sequentially compares one or more of the digits of said dialed number to the corresponding digits of said emergency number;

determining whether said call is indicated to be fraudulent;

if said call is indicated not to be fraudulent or if said call is indicated to be fraudulent but said dialed number is determined to be an emergency number, completing said call; and if said call is indicated to be fraudulent and said dialed number is determined not to be an emergency number, invoking a predetermined fraud handling procedure selected by an operator of said system.

11. The method of claim 10 wherein said emergency number is 911 and said mini B-number analysis comprises the substeps of:

determining whether the first digit of the dialed number is 9; and if the first digit of the dialed number is determined to be 9, determining whether each of the second and third digits of the dialed number is 1.

12. The method of claim 10 wherein said emergency number is 0911 and said mini B-number analysis step comprises the substeps of:

determining whether the first digit of the dialed number is 0;

if the first digit of the dialed number is 0, determining whether the second digit of the dialed number is 9; and if the second digit of the dialed number is determined to be 9, determining whether each of the third and fourth digits of the dialed number is 1.

13. The method of claim 11 wherein said emergency number is 1911 and said mini B-number analysis comprises the substeps of:

determining whether the first digit of the dialed number is 1;

if the first digit of the dialed number is 1, determining whether the second digit of the dialed number is 9; and if the second digit of the dialed number is determined to be 9, determining whether each of the third and fourth digits of the dialed number is 1.

14. The method of claim 10 wherein said mobile station is identified by a mobile identification number (MIN) and an electronic serial number (ESN) and said step of determining whether said call is indicated to be fraudulent comprises the step of determining whether said MIN/ESN pair is valid.

15. The method of claim 10 wherein said mobile station is identified by a mobile identification number (MIN) and an electronic serial number (ESN) and said step of determining whether said call is indicated to be fraudulent comprises the step of determining whether said MIN/ESN pair is indicated to be engaged in another call.

16. The method of claim 10 wherein each of said system and said mobile station generates an authentication response, the authentication response generated in said mobile station being sent to said system, and said step of determining whether said call is indicated to be fraudulent comprises the step of determining whether the authentication response sent from said mobile station matches the authentication response generated in said system.

17. The method of claim 16 wherein said authentication responses are generated from shared secret data (SSD) stored in each of said system and said mobile station, respectively, and said fraud handling procedure comprises updating the SSD in said mobile station.

18. The method of claim 10 wherein said fraud handling procedure.

19. In a wireless communications network, a call processing system comprising:

means for detecting a call placed from a mobile station in said network to a multi-digit number dialed by a user of said mobile station;

means for determining whether said call is indicated to be fraudulent;

means for determining whether said dialed number is a predefined multi-digit emergency number by performing a mini B-number analysis that sequentially compares one or more of the digits of said dialed number to the corresponding digits of said emergency number;

means for completing said call if said call is indicated not to be fraudulent, or if said dialed number is determined to be an emergency number even if said call is indicated to be fraudulent; and means for blocking said call if said call is indicated to be fraudulent and said dialed number is determined not to be an emergency number.

20. The system of claim 19 wherein said mobile station is identified by a mobile identification number (MIN) and an electronic serial number (ESN) and said means for determining whether said call is indicated to be fraudulent comprises means for determining whether said MIN/ESN pair is valid.

21. The system of claim 19 wherein said mobile station is identified by a mobile identification number (MIN) and an electronic serial number (ESN) and said means for determining whether said call is indicated to be fraudulent comprises means for determining whether said MIN/ESN pair is indicated to be engaged in another call.

22. The system of claim 19 wherein each of said network and said mobile station generates an authentication response, the authentication response generated in said mobile station being sent to said network, and said means for determining whether said call is indicated to be fraudulent comprises means for determining whether the authentication response sent from said mobile station matches the authentication response generated in said network.

* * * * *